(12) United States Patent
Herbon et al.

(10) Patent No.: US 10,949,681 B2
(45) Date of Patent: Mar. 16, 2021

(54) METHOD AND DEVICE FOR ASCERTAINING AN OPTICAL FLOW BASED ON AN IMAGE SEQUENCE RECORDED BY A CAMERA OF A VEHICLE

(71) Applicant: Robert Bosch GmbH, Stuttgart (DE)

(72) Inventors: Christopher Herbon, Boeblingen (DE); Daniel Dornbusch, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/631,092

(22) PCT Filed: Jul. 13, 2018

(86) PCT No.: PCT/EP2018/069161
§ 371 (c)(1),
(2) Date: Jan. 14, 2020

(87) PCT Pub. No.: WO2019/016104
PCT Pub. Date: Jan. 24, 2019

(65) Prior Publication Data
US 2020/0151464 A1    May 14, 2020

(30) Foreign Application Priority Data
Jul. 17, 2017    (DE) .......................... 102017212175.0

(51) Int. Cl.
*G06K 9/00* (2006.01)
*G06T 7/215* (2017.01)
(Continued)

(52) U.S. Cl.
CPC .......... *G06K 9/00791* (2013.01); *G06T 7/215* (2017.01); *H04N 5/2257* (2013.01);
(Continued)

(58) Field of Classification Search
None
See application file for complete search history.

(56) References Cited

U.S. PATENT DOCUMENTS

| 9,454,703 B2* | 9/2016 | Einecke | G01N 21/94 |
| 2017/0186169 A1* | 6/2017 | Viswanath | G06K 9/4604 |

FOREIGN PATENT DOCUMENTS

| DE | 10342388 A1 | 4/2005 |
| EP | 1617376 A2 | 1/2006 |

(Continued)

OTHER PUBLICATIONS

International Search Report for PCT/EP2018/069161; dated Oct. 19, 2018.

*Primary Examiner* — Christopher Braniff
(74) *Attorney, Agent, or Firm* — Norton Rose Fulbright US LLP; Gerard Messina

(57) ABSTRACT

A method for ascertaining an optical flow based on an image sequence recorded by a camera of a vehicle. In the process, at least one input signal, which represents vehicle surroundings and/or a driving situation of the vehicle identified using at least one sensor of the vehicle and/or a result of a previous ascertainment of the optical flow, and an image signal representing the image sequence are received. A time difference value is determined using the input signal. At least two individual images of the image sequence which are offset from one another by the time difference value are selected, using the image signal. Coinciding pixels in the individual images are detected to ascertain the optical flow using the coinciding further pixels.

10 Claims, 8 Drawing Sheets

(51) Int. Cl.
*H04N 5/225* (2006.01)
*G06T 7/269* (2017.01)
(52) U.S. Cl.
CPC ............... *G06T 2207/10016* (2013.01); *G06T 2207/30252* (2013.01)

(56) References Cited

FOREIGN PATENT DOCUMENTS

EP            2899692 A1    7/2015
JP           20010175872 A    6/2001

* cited by examiner

METHOD AND DEVICE FOR ASCERTAINING AN OPTICAL FLOW BASED ON AN IMAGE SEQUENCE RECORDED BY A CAMERA OF A VEHICLE

FIELD

The present invention is directed to a method and to a device for ascertaining an optical flow of an image sequence recorded by a camera of a vehicle. The present invention also relates to a computer program.

BACKGROUND INFORMATION

Modern vehicles may be equipped with video cameras for the purpose of driver assistance or autonomous driving. The image sequences recorded by the video cameras may, for example, be processed to calculate an optical flow.

SUMMARY

In accordance with the present invention, a method for ascertaining an optical flow based on an image sequence recorded by a camera of a vehicle, a device which uses this method, and finally a corresponding computer program are provided. The measures described herein allow advantageous refinements of and improvements on the example device according to the present invention.

An example method in accordance with the present invention for ascertaining an optical flow based on an image sequence recorded by a camera of a vehicle is provided, the method including the following steps:

receiving at least one input signal, which represents vehicle surroundings and/or a driving situation of the vehicle identified using at least one sensor of the vehicle and/or a result of a prior ascertainment of the optical flow, and an image signal representing the image sequence;

determining a time difference value, using the input signal;

selecting at least two individual images of the image sequence offset from one another by the time difference value, using the image signal; and detecting coinciding pixels in the individual images to ascertain the optical flow, using the coinciding pixels.

An optical flow may be understood to mean the description of a movement of a pixel in an image plane between two individual images of an image sequence or between a left image and a right image of a stereo camera. The optical flow is dependent on the respective time intervals between the individual images. The sensor may be the camera, an acceleration sensor, a steering wheel rotation sensor, a wheel rotation sensor, a radar sensor, a LIDAR sensor, an ultrasonic sensor, a GPS sensor, a light or a rain sensor, for example. A driving situation may be understood to mean a state of the vehicle characterized by certain vehicle parameters, such as speed, acceleration, pitch rate or roll rate. The input signal may have been generated, for example, by direct or indirect feedback with a driver assistance function of the vehicle or with a preceding calculation of the optical flow. The input signal may, for example, be a dependent or an independent signal or a combination of at least one dependent signal and one independent signal. Dependent signals result in a control loop, for example, due to their feedback, in which the result of the optical flow at a point in time t influences the result at a point in time t+Δt. A time difference value may be understood to mean a time duration, in particular, in the millisecond range. An image sequence may be understood to mean a sequence of at least two individual images. A pixel may be understood to mean an image element of an individual image. The movement of a pixel between two individual images may be ascertained as a flow vector representing the optical flow. The movement of a multitude of pixels between two individual images may, for example, be ascertained in the form of at least one flow field, each made up of a multitude of flow vectors. The flow vectors may have the same length or different lengths.

The approach described here is based on the finding that it is possible to ascertain an optical flow of an image sequence recorded by a vehicle camera on a situation-dependent variable time basis.

In contrast to conventional methods, in which a constant time difference is used when calculating the optical flow, regardless of the content of a recorded scene and the proper motion of the camera, it is possible with the aid of the approach in accordance with the present invention to prevent that a loss of the optical flow occurs in the case of a highly dynamic scene, by selecting the time offset between the camera images based on a great number of particular input signals. At the same time, the accuracy potential may be fully exhausted during the estimation of the proper motion in the case of a scene and a camera pose having little change. The use of a dynamic instead of a static time difference thus results situation-dependent in best possible flow data.

According to one specific embodiment, it is possible, in the step of determining, to determine the time difference value by reducing an output value when the input signal represents an identified automatic emergency brake application of the vehicle or, in addition or as an alternative, a pitch rate of the vehicle exceeding a threshold value. In this way, the loss of the optical flow may be prevented in highly dynamic driving situations.

In the step of determining, the time difference value may be determined by cutting the output value in half. In this way, the time difference value may be reduced with particularly short computing time.

According to another specific embodiment of the present invention, the input signal may be used in the step of determining to determine the time difference value as a function of a roll rate of the vehicle or, in addition or as an alternative, of a relative speed between the vehicle and at least one further vehicle. In this way, the loss of the optical flow may be avoided in the case of an unsteady vehicle or a shaky camera and, for example, sufficiently precise scanning of the individual images may also be ensured at low relative speeds.

The method may include a step of varying an image repetition rate of the camera, using the time difference value, to receive the image signal. In this way, the individual images of the image sequence may be recorded using an image repetition rate which is dependent on the time difference value.

It is particularly advantageous when, in the step of varying, the image repetition rate is varied in such a way that the individual images of the image sequence are offset from one another by the time difference value. In this way, the computing time for ascertaining the optical flow may be kept preferably short.

It is also advantageous when, in the step of detecting, a sub-section of the individual images is searched to detect the coinciding pixels. A sub-section may be understood to mean a search window which describes a locally delimited search area around a starting point. In this way, it may be avoided that the complete individual images are searched for a conformity of the pixel. On the one hand, the resource consumption may thus be reduced and, on the other hand, an unambiguous detection of the conformity may be ensured. Furthermore, in this way, prior geometric knowledge with respect to a movement of the image content, which is usually upwardly limited, may be included as a function of the movement of the objects in the image and the proper motion of the camera.

According to another specific embodiment of the present invention, at least one further time difference value deviating from the time difference value may be determined in the step of determining, using the input signal. In the step of selecting, it is possible to select at least two further individual images of the image sequence which are offset from one another by the further time difference value. Accordingly, in the step of detecting, coinciding further pixels may be detected in the further individual images to ascertain the optical flow, using the coinciding pixels. In this way, the optical flow may be ascertained in a given scenario in different flow fields with the aid of a different time basis in each case.

In the step of evaluating, the individual images may be evaluated to ascertain the optical flow in a first area of the vehicle surroundings, and the further individual images may be used to ascertain the optical flow in a second area of the vehicle surroundings. In this way, the optical flow may be ascertained simultaneously in different areas of the vehicle surroundings with the aid of a different time basis in each case, which is adapted to the respective area.

This method may, for example, be implemented in software or hardware or in a mixed form made up of software and hardware, for example in a control unit.

The approach presented here furthermore provides a device which is designed to carry out, activate or implement the steps of one variant of a method described here in corresponding units. The object underlying the present invention may also be achieved quickly and efficiently by this embodiment variant of the present invention in the form of a device.

For this purpose, the device may include at least one processing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data which are embedded into a communication protocol. The processing unit may be a signal processor, a microcontroller or the like, for example, it being possible for the memory unit to be a Flash memory, an EPROM or a magnetic memory unit. The communication interface may be designed to read in or output data wirelessly and/or in a wire-bound manner, a communication interface which is able to read in or output wire-bound data being able to read these data in, for example electrically or optically, from a corresponding data transmission line or to output these into a corresponding data transmission line.

A device may presently be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, in addition to other software modules.

In one advantageous embodiment, the device carries out a control of the vehicle. For this purpose, the device may access sensor signals, for example, such as acceleration signals, pressure signals, steering angle signals or surroundings sensor signals. The activation takes place via actuators, such as brake or steering actuators, or an engine control unit of the vehicle.

In addition, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the present invention are shown in the figures and are described in greater detail below.

DETAILED DESCRIPTION OF EXAMPLE EMBODIMENTS

Figure 1:
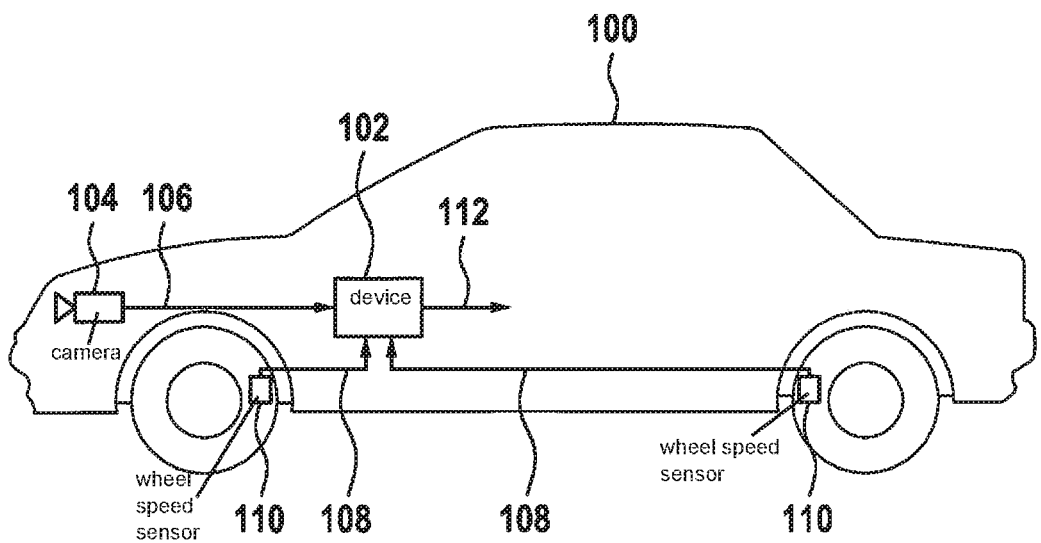
FIG. 1 shows a schematic representation of a vehicle including a device according to one exemplary embodiment.

In the description below of favorable exemplary embodiments of the present invention, identical or similar reference numerals are used for similarly acting elements shown in the different figures, and a repeated description of these elements is dispensed with.

FIG. 1 shows a schematic representation of a vehicle 100 including a device 102 according to one exemplary embodiment. Device 102 is connected to a camera 104 of vehicle 100. Camera 104 is designed to transmit an image signal 106, which represents an image sequence made up of a multitude of individual images of surroundings of vehicle 100, to device 102. Furthermore, via a suitable interface, device 102 receives at least one input signal 108, which in FIG. 1 is provided only by way of example by wheel speed sensors 110 of vehicle 100, and thus represents a wheel speed or a speed of vehicle 100. Depending on the exemplary embodiment, input signal 108 is signals, provided using different sensors of vehicle 100, for identifying the vehicle surroundings or a driving situation of vehicle 100, as is described hereafter in greater detail. As an alternative or in addition, input signal 108 also represents buffered data from a prior evaluation of image data of camera 104. Device 102 is designed to determine a time difference for ascertaining an optical flow based on the image sequence, using input signal 108. Device 102 selects at least two individual images from the image sequence whose time interval is identical to the previously determined time difference, and searches these for coinciding pixels. Based on the coinciding pixels, device 102 ascertains an optical flow of the image sequence and provides it in the form of corresponding flow data 112. For example, flow data 112 are evaluated by a control unit of vehicle 100 for activating different driver assistance functions.

According to one exemplary embodiment, device 102 is designed to vary an image repetition rate of camera 104, using the time difference determined based on input signal 108, i.e., the temporal image repetition rate is variably settable. In particular, device 102 adapts the image repetition rate in such a way in the process that the individual images of the image sequence represented by image signal 106 have a time interval with respect to one another corresponding to the time difference. To ascertain the optical flow, it is advantageous when a particular number of video images from the past were stored, and the access to each of these images takes place independently.

In this way, it is possible to consider different situations of vehicle 100 during the ascertainment of the optical flow by dynamically adapting the time difference.

The greater the time interval becomes, the greater is the movement in the image, but the more difficult is also the assignment of corresponding image points. In the case of a large time interval, slowly moving objects, such as pedestrians, may be identified, for example, while vehicle 100 is stopped. In a scenario in which vehicle 100 is moving in the same direction on a multi-lane roadway together with other vehicles, such as on an expressway, the other vehicles may be detected by the optical flow, whereas the movement of the background may no longer be identifiable. In addition, the size of the flow vector, and thus its signal-to-noise ratio (SNR), generally increases with a larger time interval, which is advantageous, for example, during the proper motion estimation.

The smaller the time interval, the higher is the likelihood that objects having a high proper speed are detected. This also applies in the case that the position of camera 104 changes at a high speed, for example due to translation or rotation. In highly dynamic driving scenarios, such as during a hard brake application, when negotiating a tight curve or driving on an uneven ground surface, device 102 advantageously selects a shorter time interval. In this way, a loss of the optical flow may be prevented. Different criteria for the selection of one or multiple different time difference(s) for the ascertainment of the optical flow or rules for deriving the time difference are described hereafter in greater detail.

Figure 2:
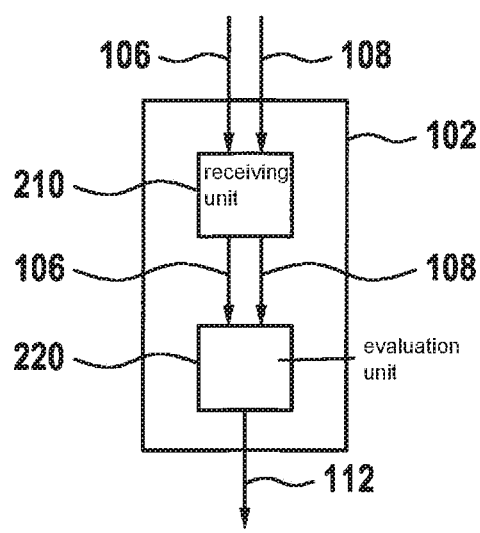
FIG. 2 shows a schematic representation of a device from FIG. 1.

FIG. 2 shows a schematic representation of a device 102 from FIG. 1. Device 102 includes a receiving unit 210 for receiving input signal 108, or also a great number of different input signals 108, and image signal 106. The evaluation of input signal 108 for determining a time difference value representing the time difference, and the evaluation of image signal 106 for selecting at least two individual images of the image sequence represented by image signal 106, which are offset from one another by the time difference value, take place in an evaluation unit 220. Evaluation unit 220 is furthermore designed to search the individual images offset from one another by the time difference value for coinciding pixels and to ascertain the optical flow of the image sequence based on these pixels. For example, only relevant sub-sections of the individual images are searched for coinciding pixels in the process to keep the computing time preferably short. Evaluation unit 220 outputs flow data 112 for further processing as the result of this evaluation.

Figure 3:
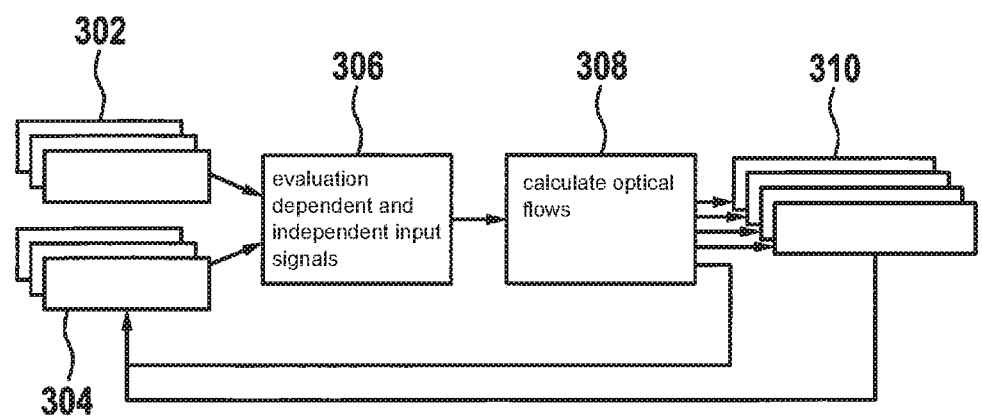
FIG. 3 shows a block diagram for describing a sequence of a method according to one exemplary embodiment.

FIG. 3 shows a block diagram for describing a sequence of a method according to one exemplary embodiment. The sequence shown in FIG. 3 corresponds to the sequence of a method carried out by a device described above based on FIGS. 1 and 2, for example.

Shown are a block 302, which represents independent input signals, and a block 304, which represents dependent input signals. The dependent and independent input signals are evaluated in a block 306 and used for determining optimal time differences $\Delta t_{1 \ldots n}$. In a further block 308, the calculation of the optical flows between image $I_t$ and image $I_{t-\Delta t}$ takes place. In the process, "t" usually denotes the instantaneous image, and $t-\Delta t$ a previous image. The result of the calculation is further processed, for example, in a block 310 by different measuring programs or functions of the vehicle. The results of the measuring programs and a statistic of the optical flow may, in turn, be used as input signals. The results of the measuring programs are incorporated via indirect feedback into block 306 in the process, whereas the results of the calculation carried out in block 308 are incorporated via direct feedback in block 306, for example, in the form of statistics. The direct or indirect feedback is identified by a dotted line.

Independent input signals represent the following information, for example:
 detection of pedestrians, bicyclists, vehicles or other objects, for example with the aid of classification;
 (stereo) depth information;
 the proper motion of the vehicle, ascertained by external motion sensors such as acceleration sensors, steering wheel rotation sensors or wheel rotation sensors;
 the proper motion of the vehicle, ascertained by image information, for example by image correlation, however not based on the optical flow;
 the proper motion of the vehicle, ascertained by external sensors such as radar sensors, LIDAR sensors, ultrasonic sensors, GPS sensors, light sensors or rain sensors;
 image-based lane detection;
 available accuracy of calibration results, for example, intrinsic parameters of the camera such as focal length or image center, extrinsic parameters with reference to global coordinates, relative extrinsic parameters (relative relationship between two cameras) or region of interest;
 exposure control;
 blindness identification;
 traffic sign identification (the vehicle is automatically decelerated upon identification of a speed limit).

Dependent input signals represent the following information, for example:
 statistics from previous calculation of the optical flow;
 flow-based proper motion estimation;

flow-based object detection;
flow-based surface estimation.

Merged input signals are, for example:

AEB signals of an automatic emergency braking function for critical, subclassified stereo objects, based on disparity and optical flow;

prefill signals for preparing the brake for a more rapid triggering of the emergency brake application.

Such a method makes it possible to determine one or multiple optical time difference(s) for calculating the optical flow as a function of the situation. The optimal time difference is defined as the longest possible time in which the availability of the optical flow is ensured, taking the requirements of subsequent measuring programs into consideration. For example, the optimal time difference for being able to capture high frequency changes in the image content is short in highly dynamic situations. In contrast, a longer time difference is better suited for carrying out a more precise proper motion estimation when driving steadily, slowly straight ahead.

With limited resources, not all possible optical flows should be calculated, but only those which are estimated to be particularly promising based on the input signals. In this way, the computing time and hardware resources may be reduced. Ultimately, more time remains for other calculations, the heat development is lower, and less expensive hardware may be utilized.

The number of required time differences $\Delta t_{l \ldots i}$ may be determined as follows:

$$\Delta t_{1 \ldots i} = \text{unique}(t \cdot \text{range}((Wa)I, T_l, T_u))$$

The included elements and operators are defined as described hereafter:

a vector of the input values with k elements j×k weighting matrix for weighting the input values, j being the number of the desired conditions I vector with k ones for the line-by-line summation of Wa t vector with j values which assigns a defined time difference to the respective line for the flow calculation thresh(a, $T_l$, $T_U$) applies the threshold vectors $T_I$ and $T_U$, element-wise to a and returns a binary vector in which one element is 1 when $T_{l,i} < a_i < T_{u,i}$, and 0 otherwise ° Hadamard product (element-wise multiplication)

unique(Y) returns all unique elements in a vector Y which are not equal to zero

For example, the optical flow is calculated as follows for continuous input signals.

If the speed is greater than 90 km/h, for example, a flow is to be calculated with $\Delta t=33$ ms, otherwise with $\Delta t=66$ ms. However, if at least one identified vehicle exists in the image, additionally a flow is to be calculated with $\Delta t=200$ ms, but only if the pitch rate, in absolute terms, is smaller than 1.5°/s. From this, it follows:

$$a = \begin{bmatrix} a_1 \\ a_2 \\ a_3 \end{bmatrix}$$

with
$a_1 = [0,250]$ (speed)
$a_2 \in \{0,1\}$ (binarized value: vehicles were identified: yes/no)
$a_3 = [-\infty, \infty]$ (pitch rate, theoretically unlimited to the upside and downside)

The weighting matrix is to evaluate two conditions for the speed twice (for the cases greater than and smaller than 90 km/h, the first two lines of the weighting matrix); as a result, it is selected as follows. The third line indicates that the presence of objects and the pitch rate are to be incorporated in the third condition:

$$w = \begin{bmatrix} 1 & 0 & 0 \\ 1 & 0 & 0 \\ 0 & 1 & 1 \end{bmatrix}$$

The threshold values are selected as follows:

$$T_l = \begin{bmatrix} 0 \\ 90 \\ 1-1.5 \end{bmatrix} = \begin{bmatrix} 0 \\ 90 \\ -0.5 \end{bmatrix}$$

$$T_u = \begin{bmatrix} 90 \\ \infty \\ 1+1.5 \end{bmatrix} = \begin{bmatrix} 90 \\ \infty \\ 2.5 \end{bmatrix}$$

For example, a speed of $a_1=115$ k/h shall be assumed. Further vehicles were identified, thus $a_2=1$. The instantaneous pitch rate shall be $a_3=-0.7°/s$.

$$Wa = \begin{bmatrix} 1 & 0 & 0 \\ 1 & 0 & 0 \\ 0 & 1 & 1 \end{bmatrix} \begin{bmatrix} 115 \\ 1 \\ -0.7 \end{bmatrix} = \begin{bmatrix} 115 \\ 115 \\ 0.3 \end{bmatrix}$$

Applying the threshold function range ((Wa)I, $T_I$, $T_U$) now results in:

$$\text{Range}((Wa)I, T_l, T_u) = \begin{bmatrix} T_{l,1} \le 115 < T_{u,1} \\ T_{l,2} \le 115 < T_{u,2} \\ T_{l,3} \le 0.3 < T_{u,3} \end{bmatrix} = \begin{bmatrix} 0 \le 115 < 90 \\ 90 \le 115 < \infty \\ -0.5 \le 0.3 < 2.5 \end{bmatrix} = \begin{bmatrix} 0 \\ 1 \\ 1 \end{bmatrix}$$

The expression ((Wa)I, $T_I$, $T_U$) thus now supplies a vector including zeros and ones, which indicates whether or not the condition of the respective column of W is met. In this example, the condition that the speed is between 0 and 90 km/h is not met. The condition that it is greater than 90 km/h is true, and the presence of vehicles with a simultaneously lower pitch rate is also true.

As a result of the element-wise multiplication with t, the vector entries which include ones are assigned with the respective time difference:

$$t \circ \begin{bmatrix} 0 \\ 1 \\ 1 \end{bmatrix} = \begin{bmatrix} 33 \text{ ms} \\ 66 \text{ ms} \\ 200 \text{ ms} \end{bmatrix} \circ \begin{bmatrix} 0 \\ 1 \\ 1 \end{bmatrix} = \begin{bmatrix} 0 \text{ ms} \\ 66 \text{ ms} \\ 200 \text{ ms} \end{bmatrix}$$

In the last step, double entries and zeros in the vector are removed, and a set of times is returned:

$$\Delta t_{1\ldots i} = \text{unique}\left(\begin{bmatrix} 0 \\ 66 \text{ ms} \\ 200 \text{ ms} \end{bmatrix}\right) = \{66 \text{ ms}, 200 \text{ ms}\}$$

Calculation Example for Binary Input Signals

The use of binary input signals results in several simplifications. The lower threshold values are reduced to the minimum number of signals required, for example.

Goal: With an automatic or a manual brake application, $\Delta t=33$ ms should apply, otherwise $\Delta t=66$ ms. From this, it follows:

$$a = \begin{bmatrix} a_1 \\ a_2 \end{bmatrix}$$

with $a_1 \in \{0,1\}$ (automatic brake application yes/no) and $a_2 \in \{0,1\}$ (manual brake application yes/no)

The weighting matrix is to include only two conditions:

1. Is the sum of the non-zero elements greater than or equal to 1?

2. Is the sum of the non-zero elements less than 1?

$$W = \begin{bmatrix} 1 & 1 \\ 1 & 1 \end{bmatrix}$$

In the case that, for example, an automatic emergency brake application is carried out and the driver does not brake manually, the product of the weighting matrix and the input signals yields the following result:

$$Wa = \begin{bmatrix} 1 & 1 \\ 1 & 1 \end{bmatrix}\begin{bmatrix} a_1 \\ a_2 \end{bmatrix} = \begin{bmatrix} 1 & 1 \\ 1 & 1 \end{bmatrix}\begin{bmatrix} 1 \\ 0 \end{bmatrix} = \begin{bmatrix} 1 \\ 1 \end{bmatrix}$$

The threshold values are selected as follows, so that at least one of the conditions has to be true (the threshold value is 0.5). In addition, the upper threshold is infinite, so that there is no maximum number of true conditions.

$$T_l = \begin{bmatrix} 0.5 \\ 0 \end{bmatrix}$$

$$T_u = \begin{bmatrix} \infty \\ 0.5 \end{bmatrix}$$

The evaluation of the threshold values supplies the following result:

$$\text{range}((Wa)I, T_l, T_u) = \begin{bmatrix} T_{l,1} \leq 1 < T_{u,1} \\ T_{l,2} \leq 1 < T_{u,2} \end{bmatrix} = \begin{bmatrix} 0.5 \leq 1 < \infty \\ 0 \leq 1 < 0.5 \end{bmatrix} = \begin{bmatrix} 1 \\ 0 \end{bmatrix}$$

The element-wise multiplication with the time difference vectors results in only one value different from zero:

$$t \circ \begin{bmatrix} 1 \\ 0 \end{bmatrix} = \begin{bmatrix} 33 \text{ ms} \\ 66 \text{ ms} \end{bmatrix} \circ \begin{bmatrix} 1 \\ 0 \end{bmatrix} = \begin{bmatrix} 33 \text{ ms} \\ 0 \end{bmatrix}$$

In the last step, double entries in the vector are now removed, and a set of times is returned:

$$\Delta t_{1\ldots i} = \text{unique}\left(\begin{bmatrix} 33 \text{ ms} \\ 0 \end{bmatrix}\right) = \{33 \text{ ms}\}$$

As an alternative to the mathematical notation, a logical notation is also possible. The core idea is to link the input variables by logical operations. If non-binary input variables are involved, additionally a lower and an upper threshold value should be defined, and the result of the threshold values should then be linked using logical operations.

The goal is to adapt the time difference of the optical flow to the roadway circumstances and the statistics of the last optical flow.

A continuous signal shall be assumed for roadway evenness (0 very smooth roadway, 1 very uneven roadway)

$a_1 = [0,1]$ and one for the number of flow vectors which have reached the maximum length of 31 pixels (measure that the time difference is too long).

$a_2 = [0,M]$

Initially, the continuous input variables are converted into binary values:

$$a^* = \begin{bmatrix} \text{range}(a_1, T_{l,1}, T_{u,1}) \\ \text{range}(a_2, T_{l,2}, T_{u,2}) \end{bmatrix}$$

Use of the exemplary values $a_1 = 0.3$ and $a_2 = 634$ $$T_l = \begin{bmatrix} 0.4 \\ 250 \end{bmatrix} \text{ and } T_u = \begin{bmatrix} 1.0 \\ \infty \end{bmatrix}$$

$$t = \begin{bmatrix} 33 \text{ ms} \\ 66 \text{ ms} \end{bmatrix} \circ \begin{bmatrix} 1 \\ 0 \end{bmatrix}$$

results in the following vector with binary values:

$$a^* = \begin{bmatrix} T_{l,1} \leq a_1 < T_{u,1} \\ T_{l,2} \leq a_2 < T_{u,2} \end{bmatrix} = \begin{bmatrix} 0.4 \leq 0.3 < 1.0 \\ 250 \leq 634 < \infty \end{bmatrix} = \begin{bmatrix} 0 \\ 1 \end{bmatrix}$$

A possible logical notation in which the two input variables are AND-ed (&) in the first case and OR-ed (I) in the second case, whereas the failure of the two conditions is intercepted in the third case, looks as follows, for example:

$\Delta t_1 = t_1(a^*_1, a^*_2)$ $\Delta t_2 = t_2(a^*_1 | a^*_2)$ $\Delta t_3 = t_3(\overline{a^*_1} \& \overline{a^*_2})$ In the specific case, thus the following values result $\Delta t_1 = 33$ ms(0 & 1)=0

$\Delta t_2 = 66$ ms(0|1)=1

$\Delta t_3 = 100$ ms(1&0)=0 and $\Delta t = \{66$ ms$\}$

Figure 4:
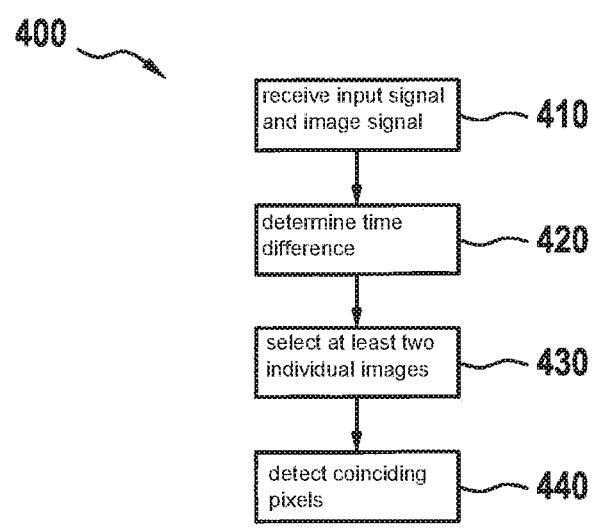
FIG. 4 shows a flow chart of a method according to one exemplary embodiment.

FIG. 4 shows a flow chart of a method 400 according to one exemplary embodiment. Method 400 for ascertaining an optical flow may be carried out by a device described above based on FIGS. 1 through 3, for example. In a step 410, the input signal and the image signal are received. In a step 420, the time difference value is determined, using the input signal. In a further step 430, at least two individual images of the image sequence offset from one another by the time difference value are selected, using the image signal. In a step 440, coinciding pixels are detected in the individual images and used to ascertain the optical flow.

Figure 5:
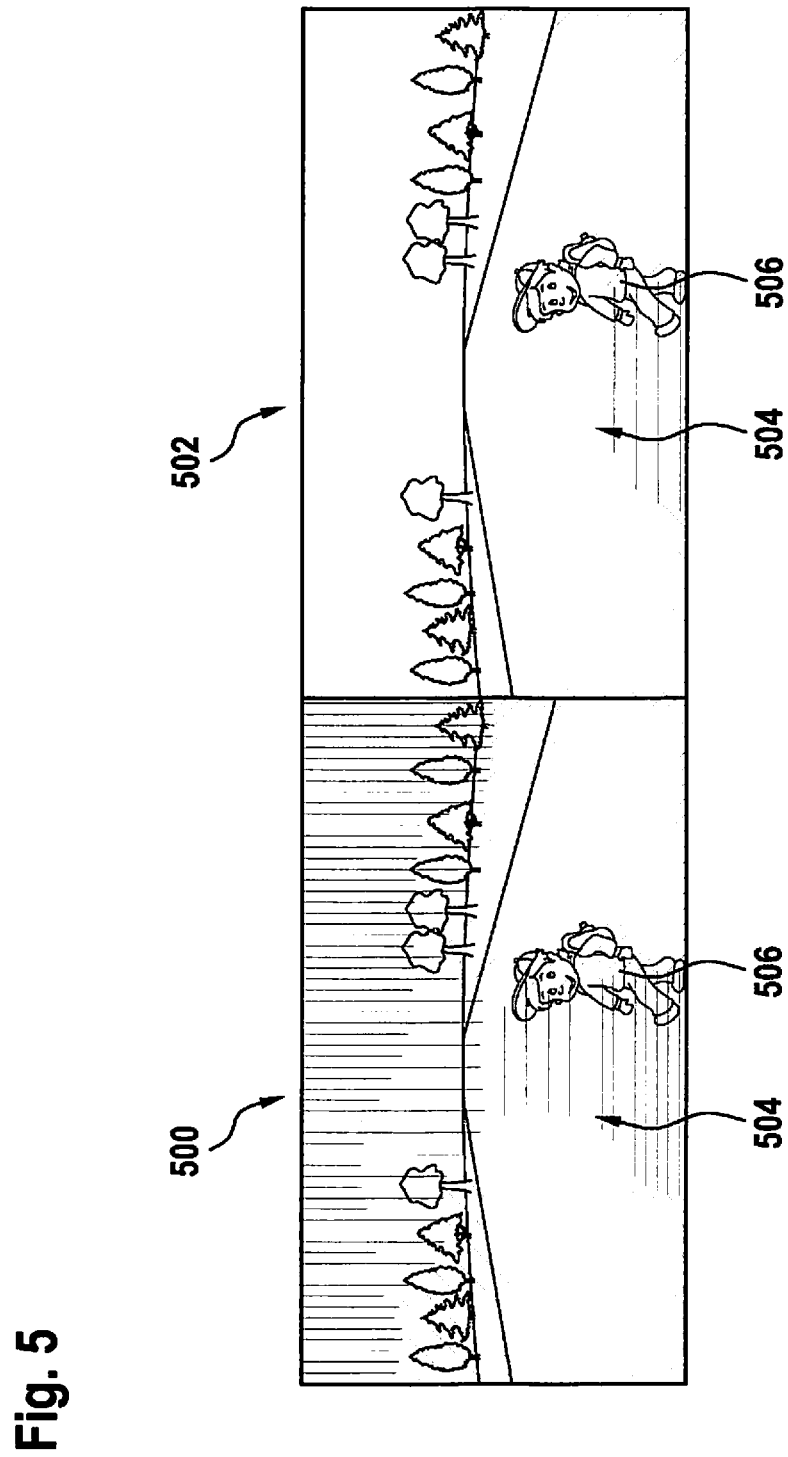
FIG. 5 shows a schematic representation of an optical flow in two individual images, recorded by a camera from FIG. 1.

FIG. 5 shows a schematic representation of an optical flow in two individual images 500, 502, recorded by a camera from FIG. 1. Individual images 500, 502 each show a child 506 crossing a roadway 504. For a better comparison, individual images 500, 502 are shown next to one another, the left individual image 500 showing the optical flow with a time difference of $\Delta t=66$ ms (t−4 to t−3), and the right individual image 502 shows the optical flow with a time difference of $\Delta t=33$ ms(t−3 to t−2). Both flow fields are usable. The number of the flow vectors is approximately the same. The length of the flow vectors in individual image 500 is approximately half as large as in individual image 502.

The optical flow is schematically indicated by hatched areas in individual images 500, 502.

Figure 6:
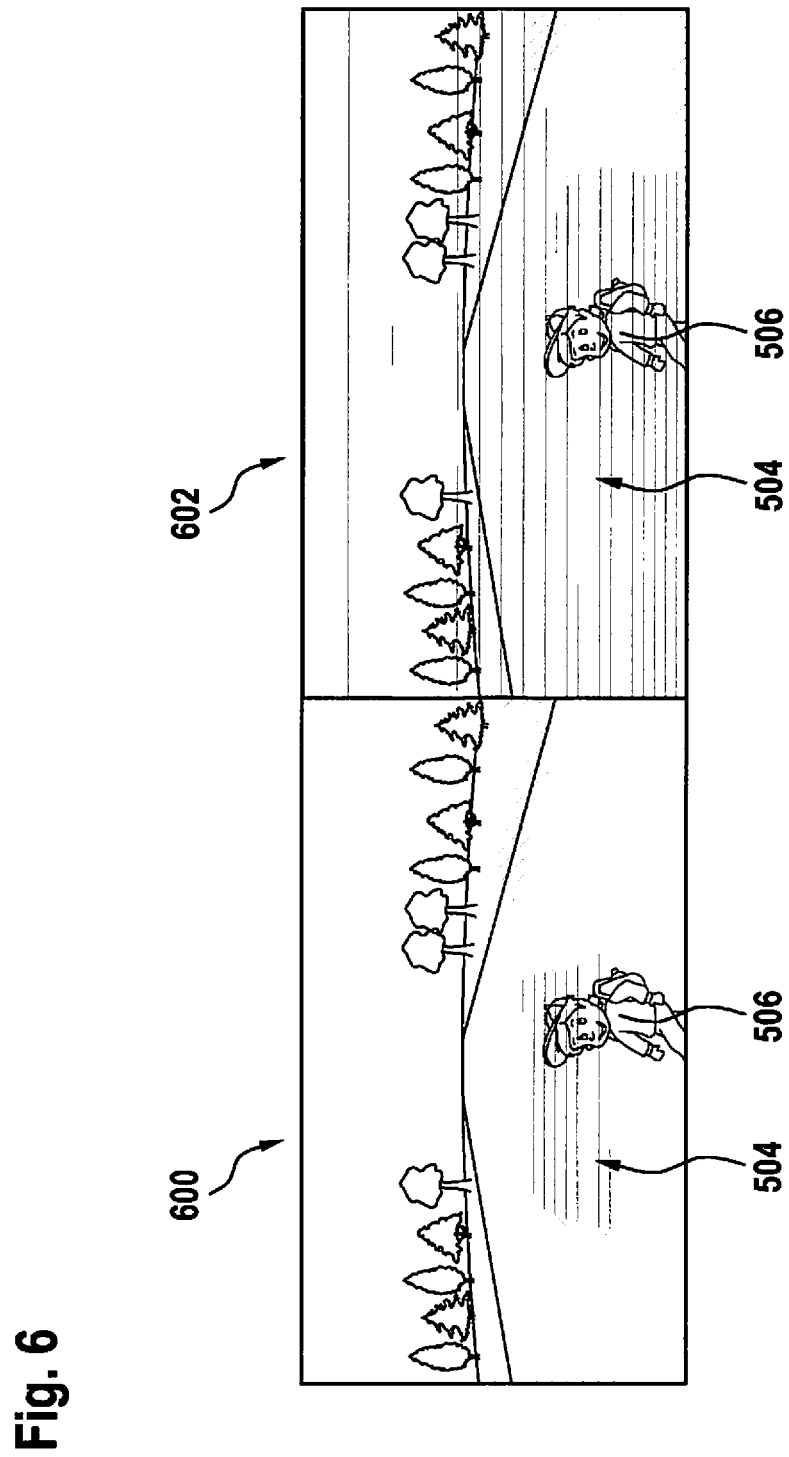
FIG. 6 shows a schematic representation of an optical flow in two individual images, recorded by a camera from FIG. 1.

FIG. 6 shows a schematic representation of an optical flow in two individual images 600, 602, recorded by a camera from FIG. 1. The optical flow is shown one chronological step later than in FIG. 5. The left individual image 600 shows the optical flow with $\Delta t=66$ ms(t−2 to t). The right individual image 602 shows the optical flow with $\Delta t=33$ ms(t−1 to t). As is apparent from FIG. 6, the optical flow is lost on the object when the time difference is too great. Switching to the shorter time difference in a timely manner provides a considerably better behavior.

Figure 7:
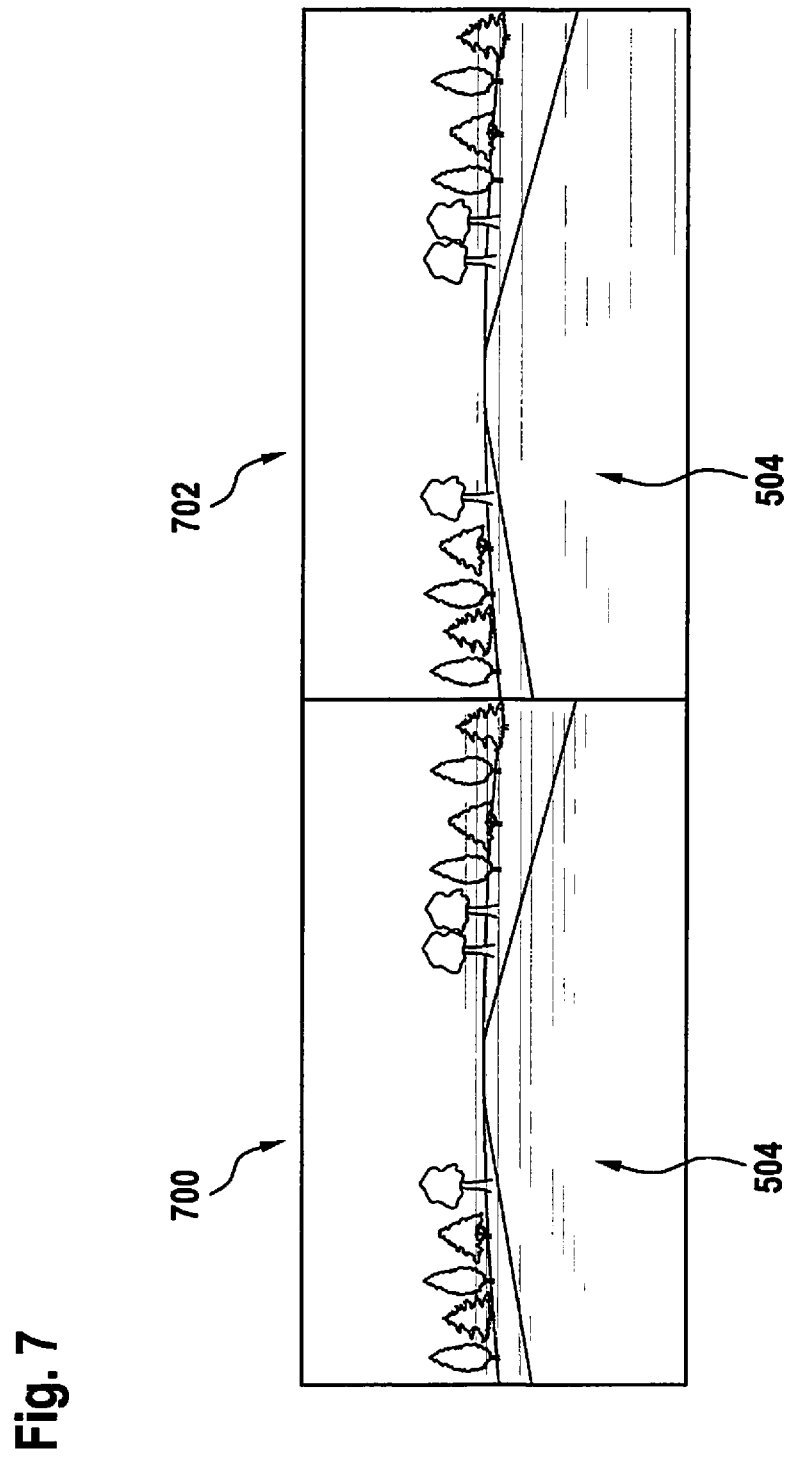
FIG. 7 shows a schematic representation of an optical flow in two individual images, recorded by a camera from FIG. 1.

FIG. 7 shows a schematic representation of an optical flow in two individual images 700, 702, recorded by a camera from FIG. 1. Shown are images of the roadway 504 with a high pitch rate of the vehicle. The lower portion of the image is missing in the flow field of the left individual image 700 ($\Delta t=66$ ms) due to excessively large flow vectors which are situated outside the search area. The flow field of the right individual image 702 ($\Delta t=33$ ms) is completely present. The reason for the more sparse visual impression in the visualization is the shorter flow vectors.

Figure 8:
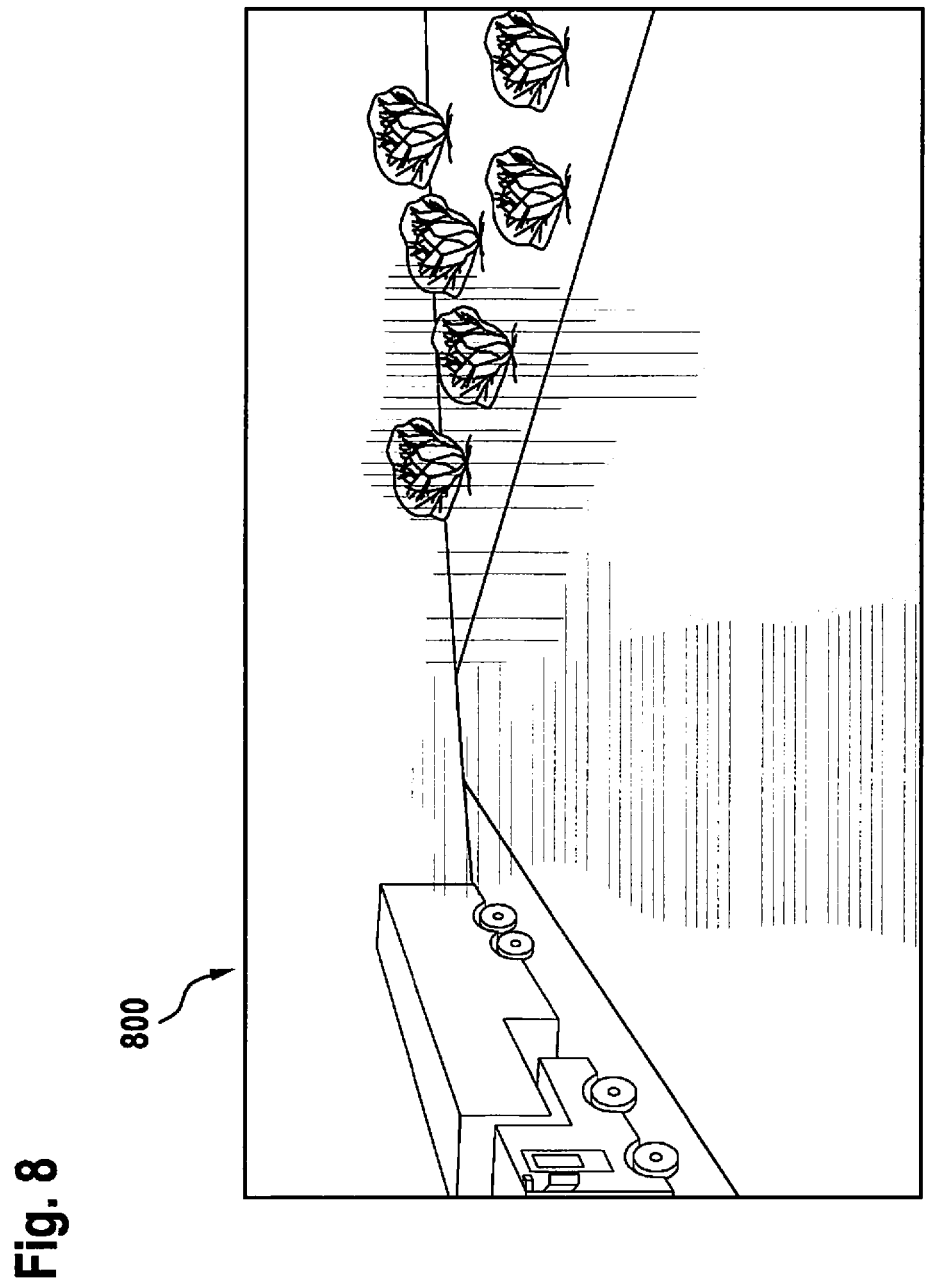
FIG. 8 shows a schematic representation of an optical flow in one individual image, recorded by a camera from FIG. 1.

FIG. 8 shows a schematic representation of an optical flow in an individual image 800, recorded by a camera from FIG. 1. In the individual image 800 shown in FIG. 8, the optical flow is concentrated in an image center. The optical flow is missing on the temporal margin areas of individual image 800 due to a strong rolling motion of the vehicle.

Figure 9:
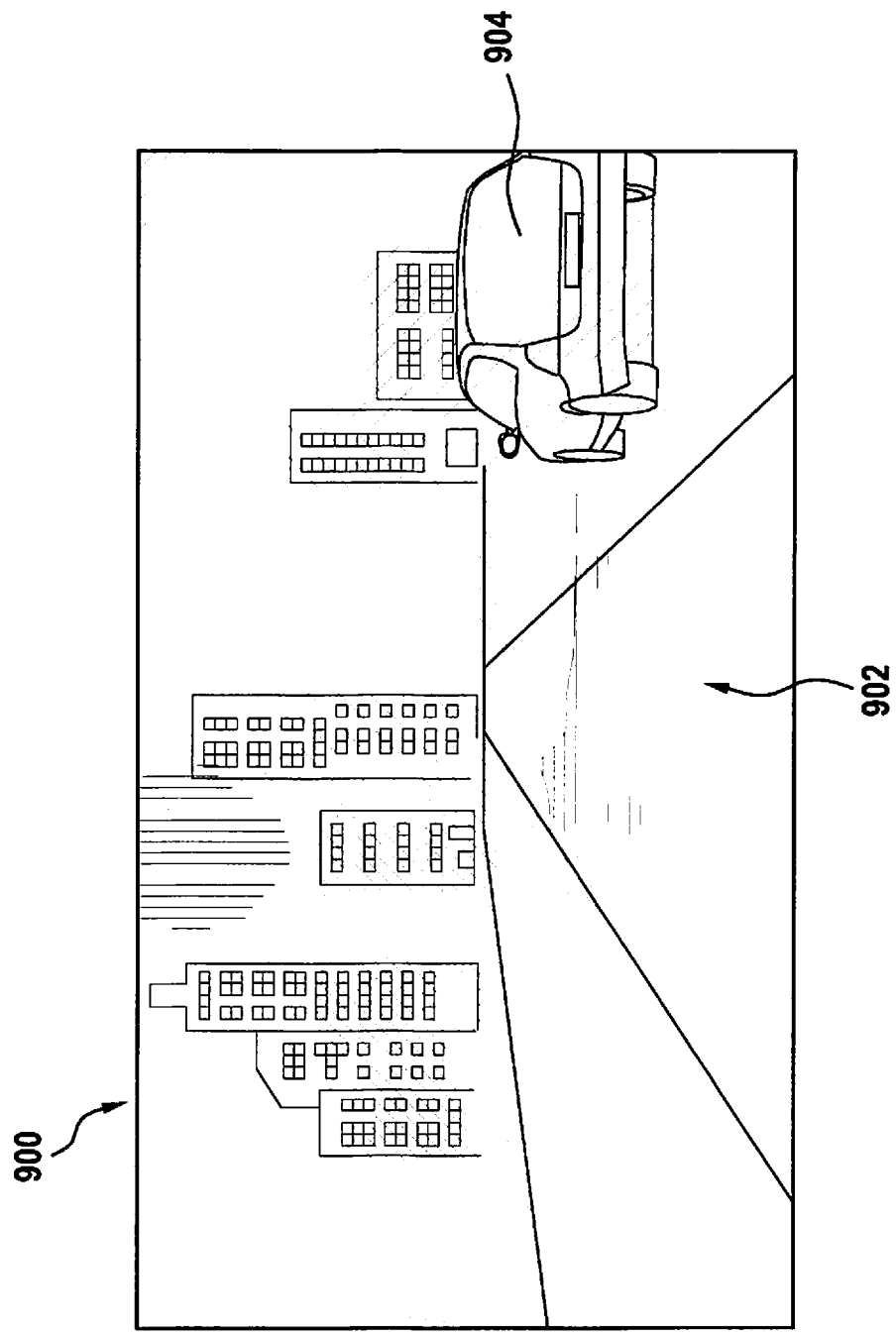
FIG. 9 shows a schematic representation of an optical flow in one individual image, recorded by a camera from FIG. 1.

FIG. 9 shows a schematic representation of an optical flow in an individual image 900, recorded by a camera from FIG. 1. Individual image 900 shows a road 902 with a vehicle 904 preceding the vehicle. The flow vectors on the road 902 are large, whereas the flow vectors on the preceding vehicle 904 are short. A further flow field having a larger time difference which is assigned to the preceding vehicle 904 results in a more precise calculation of the relative speed between the two vehicles here.

Figure 10:
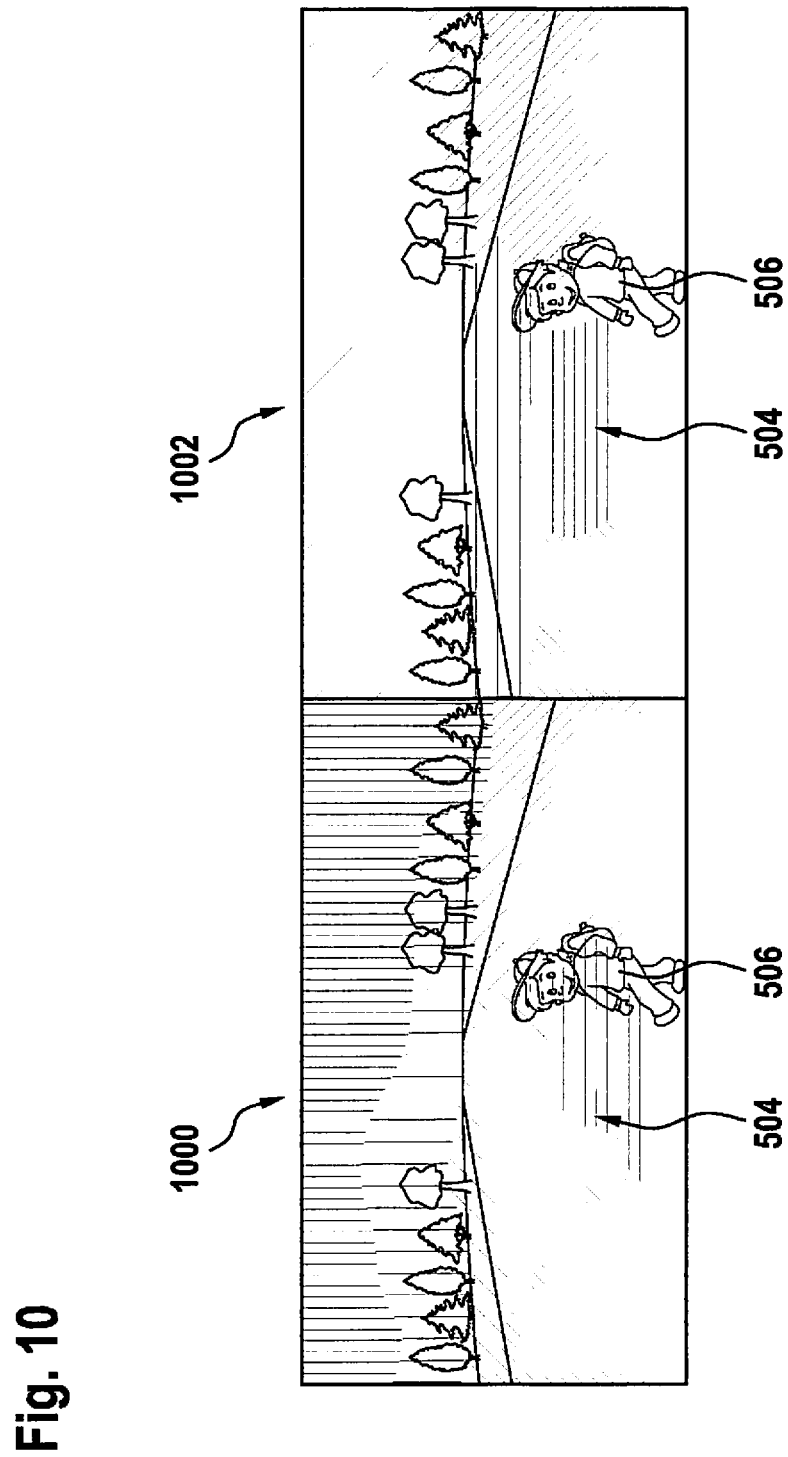
FIG. 10 shows a schematic representation of an optical flow in two individual images, recorded by a camera from FIG. 1.

FIG. 10 shows a schematic representation of an optical flow in two individual images 1000, 1002, recorded by a camera from FIG. 1. As is apparent from FIG. 10, the optical flow is lost in a particular image area, so that an excessively high proper motion of the vehicle is to be assumed.

For example, a flow field which arose during an emergency brake application for a child dummy is known from the left image 1000. Compared to this previous calculation of the flow field, any flow result is missing in the next image 1002 in the place in the center of the image where the child dummy is situated. These are not flow vectors having the length zero, but a non-present detection of flow measurements. Consequently, it may be inferred that the relative movement of the object was too great for the search area of the optical flow. In this case, according to one exemplary embodiment of the present invention described here, a division into two flow fields having different time differences takes place.

Various applications of the approach described here are presented hereafter.

For example, the optical flow may be lost in the close-up range in certain circumstances during an emergency brake application for a child dummy. There are two reasons for this.

First, the child dummy continues to migrate further downwardly in the image as a result of the ego-vehicle approaching the relatively small child dummy. The resulting flow vectors thus increasingly point downwardly.

Added to this is the pitch motion of the vehicle after the emergency brake application has been triggered, which shifts the entire image content in the vertical direction. An initial pitching is followed by an upward counter motion, which causes the flow vectors for the dummy to become even longer, until these no longer fit in the search area, which is heavily limited for technical reasons, whereby the flow detection for the child dummy fails. By cutting the time difference between the images in half, for example from 66 to 33 ms, the flow result may be considerably improved. However, in general it is not desirable to carry out all measurements on a 33 ms basis. As a result, such a switch in the time basis is only carried out, for example, in the case of an automatic emergency brake application based on a corresponding emergency braking signal. The emergency braking signal is based on a situation analysis of objects which were detected by an evaluation of the disparity and flow, and confirmed with the aid of a classifier, for example by an image-based subclassification as a braking-relevant object, such as a car, a truck, a pedestrian or a bicyclist.

The image-based pitch rate of the vehicle is calculated independently from the optical flow, for example. If it is very large, the time basis is reduced, thereby compensating for the high dynamics of the motion.

In particular, in the case of tall vehicles such as trucks, high roll rates may occur on an uneven roadway, for example due to potholes. This causes the flow field to collapse at the margins of the image since the optical flow leaves the search area. However, flow is still found in the center of the image, from which is it also possible to estimate the roll rate. In such a case, the greatest meaningful time difference for the calculation of the optical flow is ascertained, for example, based on the roll rate and the known magnitude of the search area.

If the vehicle sensors and the rotation of the camera, determined independently from the optical flow, deliver meager results and, at the same time, the speed of the vehicle is low, a smooth drive may be inferred. In this case, the time basis is extended, for example, to increase the accuracy of the flow-based proper motion estimation.

When driving on an expressway, a high speed is known based on the wheel speed sensors. At the same time, additional vehicles are identified ahead of and next to the ego-vehicle by classifiers, regardless of the optical flow. In this case, for example, a short time difference $\Delta t_1$ is determined for the calculation of the optical flow on the roadway for the proper motion estimation and the surface estimation. In addition, a second, longer time difference $\Delta t_2$ may be derived, with the aid of which the relative speed between the ego-vehicle and preceding vehicles is estimated very precisely in a flow-based manner.

If the reverse gear is engaged, a parking maneuver may be assumed. Here, for example, a mean value is used as a time basis for the optical flow, which also ensures adequate accuracy of the proper motion estimation and sufficiently short latencies until the flow results are received.

If the image-based surface estimation dependent on the optical flow predicts an uneven roadway, the time difference is selected to be short, for example, to compensate for the high dynamics. However, if an adaptive activation of the chassis is simultaneously active to compensate for uneven surfaces, also referred to as Magic Carpet, the time difference is again extended accordingly.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for ascertaining an optical flow based on an image sequence recorded by a camera of a vehicle, the method comprising the following steps:
   receiving at least one input signal which represents vehicle surroundings and/or a driving situation of the vehicle identified using at least one sensor of the vehicle and/or a result of a previous ascertainment of the optical flow, and an image signal representing the image sequence;
   determining a time difference value using the input signal;
   selecting at least two individual images of the image sequence which are offset from one another by the time difference value using the image signal; and
   detecting coinciding pixels in the individual images to ascertain the optical flow using the coinciding pixels,
   wherein, in the step of determining, at least one further time difference value deviating from the time difference value is determined, using the input signal, in the step of selecting, at least two further individual images of the image sequence which are offset from one another by the further time difference value being selected, and in the step of detecting, coinciding further pixels being detected in the further individual images to ascertain the optical flow, using the coinciding further pixels.

2. The method as recited in claim 1, wherein, in the step of determining, the time difference value is determined by reducing an output value when the input signal represents an identified automatic emergency brake application of the vehicle and/or a threshold value exceeding a pitch rate of the vehicle.

3. The method as recited in claim 2, wherein, in the step of determining, the time difference value is determined by cutting the output value in half.

4. The method as recited in claim 1, wherein, in the step of determining, the input signal is used to determine the time difference value as a function of a roll rate of the vehicle and/or of a relative speed between the vehicle and at least one further vehicle.

5. The method as recited in claim 1, further comprising the following step:
   varying an image repetition rate of the camera, using the time difference value, to receive the image signal.

6. The method as recited in claim 5, wherein, in the step of varying, the image repetition rate is varied in such a way that the individual images of the image sequence are offset from one another by the time difference value.

7. The method as recited in claim 1, wherein, in the step of detecting, a sub-section of the individual images is searched to detect the coinciding pixels.

8. The method as recited in claim 1, wherein, in the step of evaluating, the individual images are evaluated to ascertain the optical flow in a first area of the vehicle surroundings, and the further individual images are used to ascertain the optical flow in a second area of the vehicle surroundings.

9. A device configured to ascertain an optical flow based on an image sequence recorded by a camera of a vehicle, the device configured to:
   receive at least one input signal which represents vehicle surroundings and/or a driving situation of the vehicle identified using at least one sensor of the vehicle and/or a result of a previous ascertainment of the optical flow, and an image signal representing the image sequence;
   determine a time difference value using the input signal;
   select at least two individual images of the image sequence which are offset from one another by the time difference value using the image signal; and
   detect coinciding pixels in the individual images to ascertain the optical flow using the coinciding pixels,
   wherein, in the step of determining, at least one further time difference value deviating from the time difference value is determined, using the input signal, in the step of selecting, at least two further individual images of the image sequence which are offset from one another by the further time difference value being selected, and in the step of detecting, coinciding further pixels being detected in the further individual images to ascertain the optical flow, using the coinciding further pixels.

10. A non-transitory machine-readable storage medium on which is stored a computer program for ascertaining an optical flow based on an image sequence recorded by a camera of a vehicle, the computer program, when executed by a computer, causing a computer to perform the following steps:
   receiving at least one input signal which represents vehicle surroundings and/or a driving situation of the vehicle identified using at least one sensor of the vehicle and/or a result of a previous ascertainment of the optical flow, and an image signal representing the image sequence;
   determining a time difference value using the input signal;
   selecting at least two individual images of the image sequence which are offset from one another by the time difference value using the image signal; and
   detecting coinciding pixels in the individual images to ascertain the optical flow using the coinciding pixels,
   wherein, in the step of determining, at least one further time difference value deviating from the time difference value is determined, using the input signal, in the step of selecting, at least two further individual images of the image sequence which are offset from one another by the further time difference value being selected, and in the step of detecting, coinciding further pixels being detected in the further individual images to ascertain the optical flow, using the coinciding further pixels.

\* \* \* \* \*